United States Patent
Seghezzi

(10) Patent No.: US 9,022,371 B2
(45) Date of Patent: May 5, 2015

(54) AUTOMATED STORAGE ACCESSORIES

(75) Inventor: Maria Rosaria Seghezzi, Cilavegna (IT)

(73) Assignee: Ferrinox Automotive SRO, Nitra (SK)

(*) Notice: Subject to any disclaimer, the term of this patent is extended or adjusted under 35 U.S.C. 154(b) by 1162 days.

(21) Appl. No.: 12/737,250

(22) PCT Filed: Jun. 30, 2008

(86) PCT No.: PCT/EP2008/005445
§ 371 (c)(1),
(2), (4) Date: Mar. 9, 2011

(87) PCT Pub. No.: WO2011/000287
PCT Pub. Date: Jan. 7, 2010

(65) Prior Publication Data
US 2011/0169207 A1    Jul. 14, 2011

(51) Int. Cl.
| B23Q 3/00 | (2006.01) |
| B25B 1/00 | (2006.01) |
| B23Q 1/25 | (2006.01) |
| A47F 5/08 | (2006.01) |
| A47F 7/00 | (2006.01) |
| F16B 45/00 | (2006.01) |
| B65G 1/14 | (2006.01) |

(52) U.S. Cl.
CPC .......................... B65G 1/14 (2013.01)

(58) Field of Classification Search
USPC .......... 269/55; 211/70.6, 57.1, 59.1; 248/304, 248/15, 220.41
See application file for complete search history.

(56) References Cited

U.S. PATENT DOCUMENTS

| 2,974,804 | A | * | 3/1961 | Maro | 211/70.6 |
| 3,220,363 | A | * | 11/1965 | Gingher | 108/147.17 |
| 4,094,415 | A | * | 6/1978 | Larson | 211/57.1 |
| 5,039,366 | A | * | 8/1991 | Strattman | 156/71 |
| 5,398,820 | A | * | 3/1995 | Kiss | 211/13.1 |
| 5,415,370 | A | * | 5/1995 | Valiulis | 248/220.41 |
| 5,645,177 | A | * | 7/1997 | Lin | 211/70.6 |
| 5,687,856 | A | * | 11/1997 | Kendrena | 211/70.6 |
| 5,842,583 | A | * | 12/1998 | Kasa-Djukic | 211/65 |
| 5,853,092 | A | * | 12/1998 | Goodman et al. | 211/70.6 |
| 6,109,569 | A | * | 8/2000 | Sakaida | 248/75 |
| D454,740 | S | * | 3/2002 | Baggott | D6/534 |
| 6,499,608 | B1 | * | 12/2002 | Sterling et al. | 211/70.6 |
| 7,080,733 | B2 | * | 7/2006 | Kao | 206/372 |
| 7,775,492 | B2 | * | 8/2010 | Pierzynski et al. | 248/220.43 |
| 7,802,680 | B2 | * | 9/2010 | Krebs et al. | 206/349 |
| 8,028,966 | B2 | * | 10/2011 | Chen | 248/304 |
| 8,221,297 | B2 | * | 7/2012 | Faust | 483/59 |
| 8,302,786 | B2 | * | 11/2012 | Kao | 211/70.6 |
| 8,646,136 | B2 | * | 2/2014 | Young et al. | 5/717 |
| 2006/0067661 | A1 | * | 3/2006 | Pierzynski et al. | 396/71 |
| 2008/0210649 | A1 | * | 9/2008 | Faust | 211/59.1 |
| 2010/0071136 | A1 | * | 3/2010 | Weber | 5/655.9 |
| 2011/0179579 | A1 | * | 7/2011 | Henderson et al. | 5/717 |
| 2012/0305438 | A1 | * | 12/2012 | Kao | 206/525 |
| 2013/0240394 | A1 | * | 9/2013 | Wang | 206/372 |
| 2013/0292348 | A1 | * | 11/2013 | Sprang, Jr. | 211/49.1 |

FOREIGN PATENT DOCUMENTS

WO    WO 2010093513 A1 *  8/2010

* cited by examiner

Primary Examiner — Lee D Wilson
Assistant Examiner — Alvin Grant
(74) Attorney, Agent, or Firm — Olson & Cepuritis, Ltd.

(57) ABSTRACT

Kit of improved accessories suitable for automated storage structures (20) comprising an automatic clamping system adapted to lock in position workpieces stored during transport on a truck, plant conveyor or any other vehicle and supporting elements (11) for the workpieces stored each formed by bending of iron wire according to the workpiece profile.

5 Claims, 3 Drawing Sheets

Figure 1:
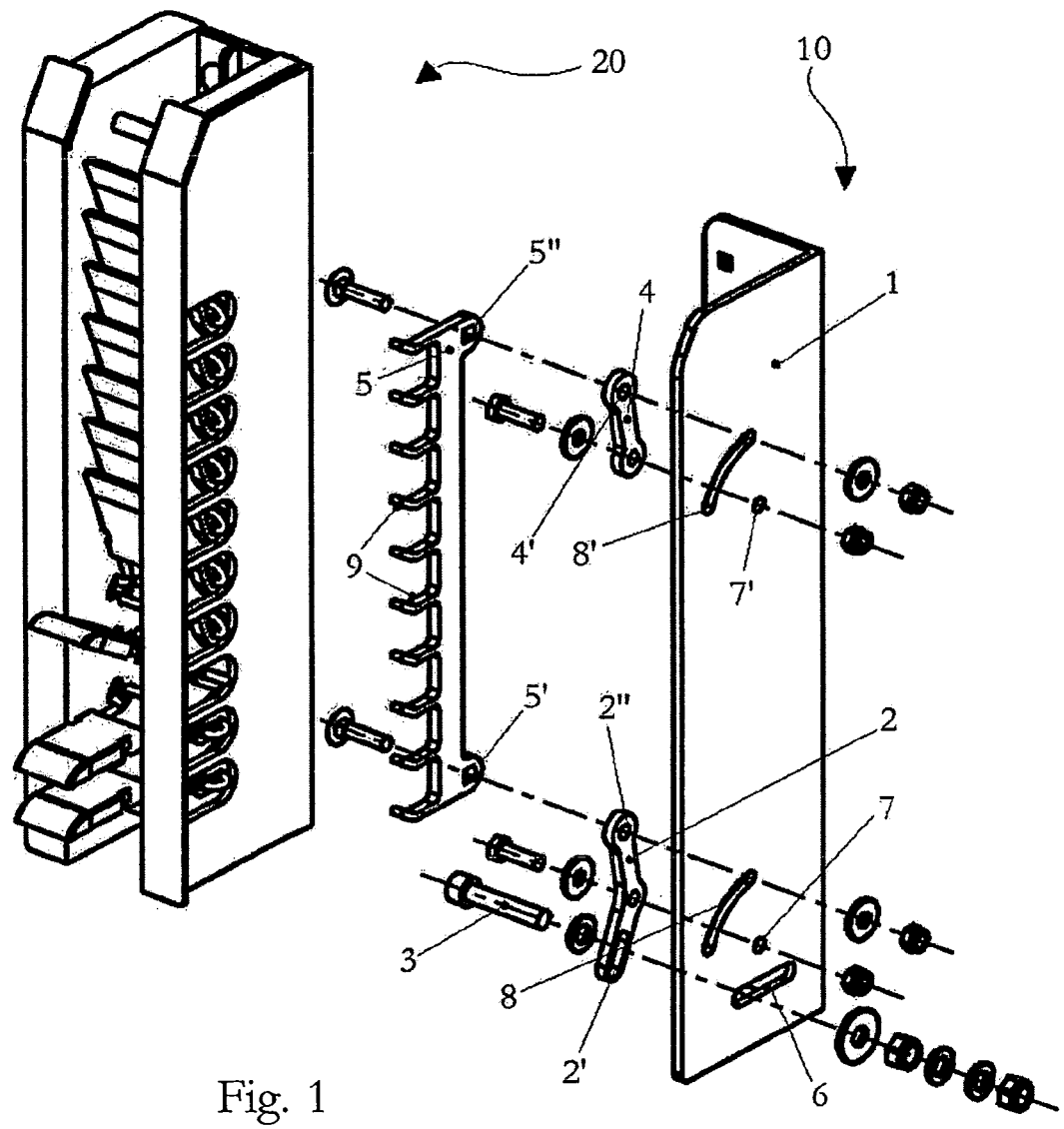

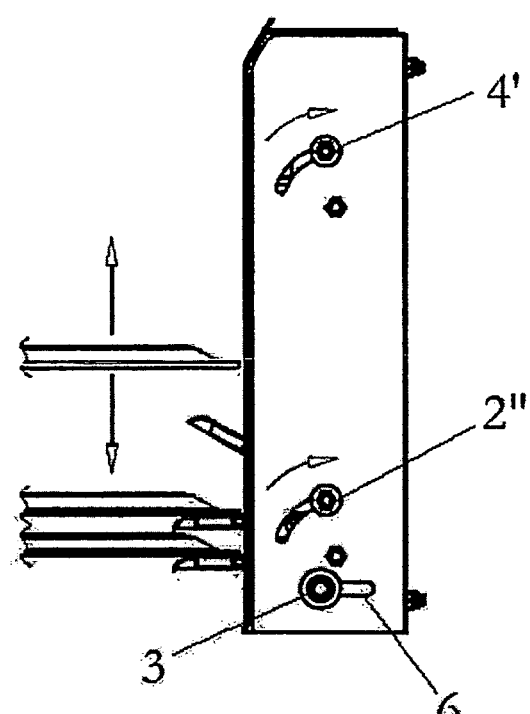
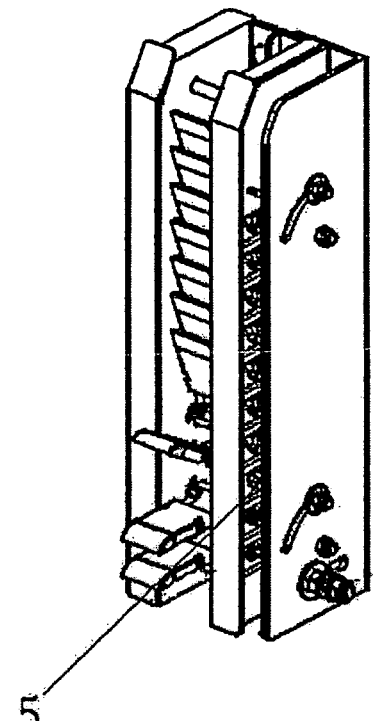
Fig. 2a  Fig. 2b
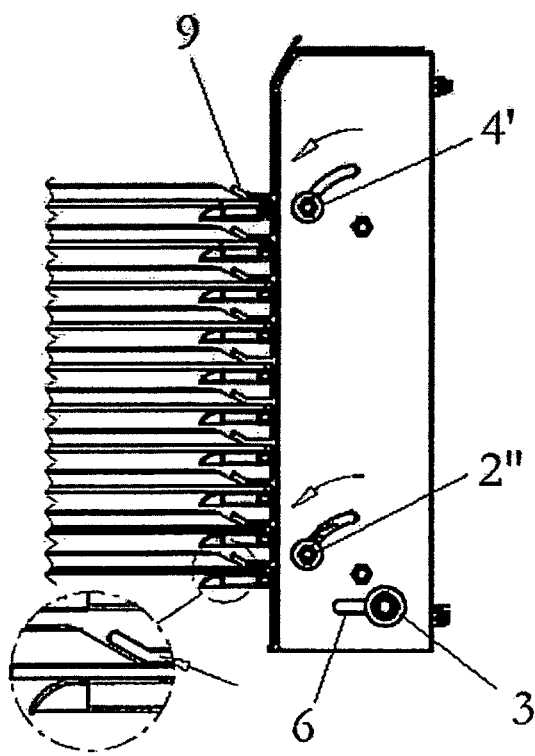
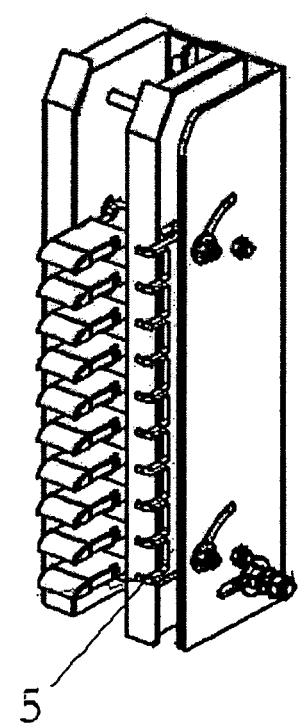
Fig. 3a  Fig. 3b

AUTOMATED STORAGE ACCESSORIES

The present invention relates to a kit of improved accessories suitable for an automated storage column. The kit preferably comprises a workpiece clamping system and a very light supporting element for the workpieces stored.

The automated storage structures, which will be referred in the following disclosure of the present invention, comprise, as known in the art, a set of columns each provided with a plurality of supporting elements placed equidistant in respect of each other along the whole height of the column. In the plurality each supporting element results cinematically linked either to the lower supporting element or to the upper supporting element: in this manner, starting from the bottom of a column, each workpiece resting on the first supporting element causes it, due to the weight of the same workpiece, to completely lower thus, by the cinematic linkage, making the second upper supporting element to partially project out of the column waiting for the next workpiece to be stored; once the next workpiece stored on the second supporting element, the upper supporting element in turn will project out of the column so allowing an automatic continuous storage. The automated storage structure will comprise a set of the columns suitably placed in respect of one another in order to form the necessary bearing for the workpieces manufactured.

Moreover, the workpieces have often to be transported to a different machine station or even to another factory to complete the manufacturing process: there is therefore the problem of assuring the necessary stability of the workpieces stored in the automated structures when loaded on trucks, plant conveyors or the like. As previously disclosed and known in the art, the automated storage structures provides only a number of bearing points, according to the number of columns in the structures, sufficient for assuring a static equilibrium under the only force of gravity. During transport, instead, there are forces occurring, due to dynamic stresses, in any possible direction and therefore, if no further constrained, workpieces can fall down or anyway shift from their initial bearing position.

Main object of the present invention is therefore to provide a kit of improved accessories which allows for the best arrangement of workpieces on the automated storage columns and inside the storage structures.

Further object of the present invention is to provide a kit of improved accessories which have a reduced weight in order to assure:
- easier transport of each automated storage structure, fully or partially loaded,
- lower manufacturing costs of the accessories,
- lower transporting costs of each automated storage structure, fully or partially loaded,
- no maintenance needs.

The kit of improved accessories according to the present invention comprises a workpiece clamping system and a plurality of workpiece supporting elements.

The workpiece clamping system may be designed so as to couple with the corresponding automated storage column, thus being in turn automated. The clamping system according to the present invention, indeed, is provided with means for automatically clamp workpieces stored, once the automated storage structure has been loaded on a particular transport system.

The workpiece supporting element is formed from a steel wire so as to be easily shaped in accordance with the workpiece shape at the bearing point. In such way, a lighter and cheaper supporting element can be obtained, different from the prior art supporting element formed, instead, from a metallic slab, much more heavier and expensive.

Figure 4:
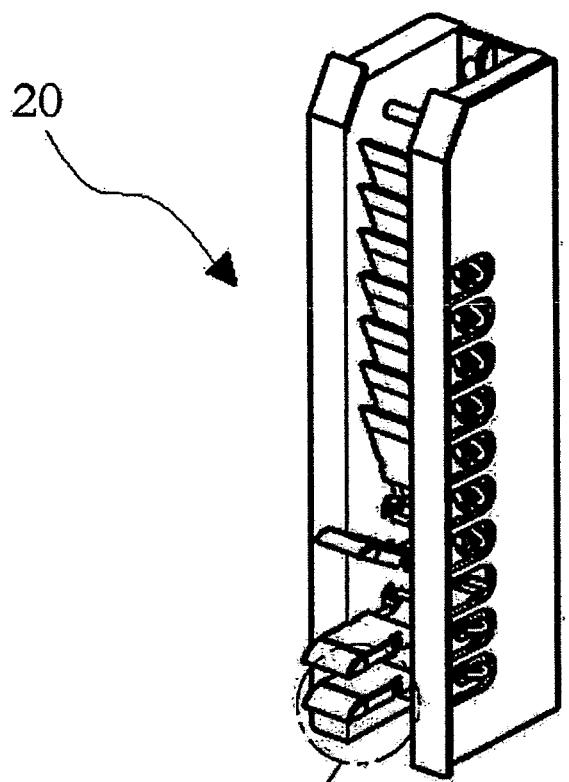
Figure 5:
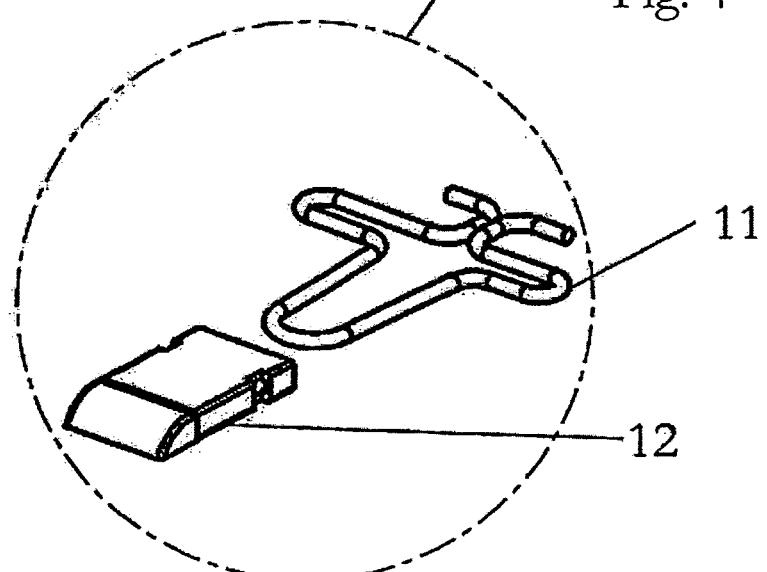

A preferred embodiment of the kit of improved accessories according to the present invention will be now described in greater detail and with reference to the annexed drawings, in which:

FIG. 1 is an exploded perspective view of a prior art automated storage column provided with the workpiece clamping system according to a preferred embodiment of the present invention, FIG. 2a is a side view of the embodiment of FIG. 1 in idle mode, FIG. 2b is a perspective view of the embodiment of FIG. 1 in the mode of FIG. 2a, FIG. 3a is a side view of the embodiment of FIG. 1 in operation mode, FIG. 3b is a perspective view of the embodiment of FIG. 1 in the mode of FIG. 3a, FIG. 4 is a perspective view of a prior art automated storage column provided with a plurality of workpiece supporting elements according to a preferred embodiment of the present invention, and FIG. 5 is an enlarged view of a supporting element of the plurality in FIG. 4.

With reference now to FIG. 1, there are shown an automated storage column 20 according to prior art and a clamping system 10 according to a preferred embodiment of the present invention. The clamping system 10 comprises a supporting slab 1, on the lower part provided with a horizontal slot 6, a slot 8 shaped as a circumference arc the bending center of which coincides with a hole 7, and on the upper part with a slot 8' shaped as a circumference arc the bending center of which coincides with a hole 7' also lying on the vertical passing through the position of the hole 7. A first rocker arm 2 is hinged by a pin in the hole 7 and has a first end provided with a slot 2' and a second end provided with a hole 2". Similarly a second rocker arm 4 results hinged by a pin at the hole 7' and has one end provided with a hole 4'. A rack 5, provided with a lower hole 5' and an upper hole 5", is coupled by a pin through holes 5" and 4' and a pin through holes 5' and 2" with the rocker arms 2 and 4, respectively. Therefore cinematically the clamping system 10 results as a double rocker arm articulated quadrilateral, in which the connecting rod is constituted by the rack 5. Finally a pin 3 is in slidable manner inserted between the slot 2' of the first rocker arm 2 and the horizontal slot 6 of the supporting slab 1.

Referring now to FIGS. 2a and 3a or FIGS. 2b and 3b, it is possible to notice how the movement of the pin 3 along the slot 6 causes the rotation of the rocker arm 2 around the position 7, as well as of the rocker arm 4 around the position 7'. Therefore the idle mode arrangement (see FIGS. 2a and 3a) of the clamping system 10 corresponds to the internal position of pin 3, which forces the rack 5 to remain between the supporting slab 1 and a side face of the automated storage column 20. A shift of the pin 3 from internal position to the external position, as just disclosed, leads to a simultaneous and concordant rotation of the rocker arms 2 and 4 that causes the rack 5 to translate till it comes out the space between the supporting slab 1 and the side face of the column 20. In such arrangement, that is operational mode arrangement, a plurality of projecting parts 9 provided on the rack 5 abuts against each workpiece stored, in turn abutting on a supporting element, thus assuring the clamping of the all workpieces stored, as it is clearly seen from FIG. 3a.

The switching of the clamping system 10 according to the present invention from the idle mode arrangement, in which it is possible to load or unload the workpieces on the automated storage structure, to the operation mode arrangement is made automatic once means (not shown) for engaging the pin 3 have been provided on load bays suitable for the storage structure: thus loading of the automatic storage structures will force the pin to move backward from internal to external position leading the rack 5, as just disclosed, to clamp the current workpieces and allow the transport thereof under stability and safety conditions.

With reference now to FIGS. 4 and 5, there is shown an automated storage column 20 according to prior art and provided with a plurality of supporting elements 11, each of the elements in turn provided with a cover 12 made of polyethylene or other material which avoids a direct contact between two metallic surfaces and therefore possible damages of workpieces. As it can be noticed from FIG. 5, the supporting elements 11 are made of iron wire, preferably harmonic steel, suitably bent in order to obtain the desired shape fitting the particular workpiece profile. It is therefore clear that the production of the supporting elements 11 allows a great saving of the material used for their manufacturing. Moreover the possibility of using the iron wire, having diameter size suitable for specific application, assures all the advantages connected to the machining necessary to obtain the supporting elements 11 according to the present invention.

Such supporting element 11 besides offering a saving in terms of raw material, considerably lightens manufacture thus achieving:

saving of transport costs under the same volume produced,
a better adaptability with the automized banked lines in the various automotive companies because the load of the columns rests less on the structure provided for the automized pallet handling.

The invention claimed is:

1. Kit of accessories suitable for automated storage structures comprising:
   (I) an automatic clamping system (10) comprising:
      (i) a frame (1),
      (ii) at least a pair of rocker arms (2, 4) hinged onto said frame (1), at least one of the rocker arms (2, 4) defining a slot (2'),
      (iii) a supporting member (5) supporting a plurality of clamping elements (9) for workpieces stored in said automated storage structures, said supporting member (5) operatively connected to said at least one pair of rocker arms (2, 4), and
      (iv) a pin (3) in said slot (2') and arranged to cooperate with automatic mechanisms provided on load bays for said automated storage structures,
   (II) at least a workpiece supporting element (11) characterized by the fact that said workpiece supporting element (11) is a bent iron wire made of elasto-plastic material.

2. Kit of accessories suitable for automated storage structures according to claim 1, wherein:
   (I) said frame (1) is a slab shaped to couple with corresponding automated storage column,
   (II) said supporting element (11) is made of harmonic steel.

3. Kit of accessories suitable for automated storage structures according to claim 1, wherein:
   (I) said frame (1), said at least one pair of rocker arms (2, 4) and said supporting member (5) form a double rocker arm articulated quadrilateral,
   (II) said supporting element (11) is further provided with a cover.

4. Kit of accessories suitable for automated storage structures according to claim 1, wherein said slot (2') is a straight slot.

5. Kit of accessories suitable for automated storage structures according to claim 4, wherein said pin (3) is slidable in said straight slot.

\* \* \* \* \*